United States Patent
Conrad et al.

(10) Patent No.: US 6,782,585 B1
(45) Date of Patent: Aug. 31, 2004

(54) UPRIGHT VACUUM CLEANER WITH CYCLONIC AIR FLOW

(75) Inventors: Wayne Ernest Conrad, Hampton (CA); Helmut Gerhard Conrad, Hampton (CA)

(73) Assignee: Fantom Technologies Inc., Welland (CA)

(*) Notice: Subject to any disclaimer, the term of this patent is extended or adjusted under 35 U.S.C. 154(b) by 0 days.

(21) Appl. No.: 09/679,353

(22) Filed: Oct. 5, 2000

Related U.S. Application Data

(60) Division of application No. 09/239,860, filed on Jan. 29, 1999, now Pat. No. 6,334,234, which is a continuation-in-part of application No. 09/227,534, filed on Jan. 8, 1999, now Pat. No. 6,141,826.

(51) Int. Cl.[7] .................................................. A47L 9/10
(52) U.S. Cl. ............................ 15/353; 15/351; 15/352; 55/DIG. 3; 55/343; 55/349
(58) Field of Search ......................... 15/347, 350, 351, 15/352, 353; 55/337, 459.1, 343, 349, 346, 345, DIG. 3

(56) References Cited

U.S. PATENT DOCUMENTS

| | | | |
|---|---|---|---|
| 450,372 A | 4/1891 | Morse | 55/424 |
| 883,413 A | 3/1908 | Mahony | 15/323 |
| 1,023,082 A | 4/1912 | Kluge | 55/345 |
| 1,127,896 A | 2/1915 | Keller | 55/325 |
| 1,369,939 A | 3/1921 | Shaffer | 110/300 |
| 1,416,995 A | * 5/1922 | Stroud | 55/343 |
| 1,752,231 A | 3/1930 | Clarkson | 55/410 |
| 1,759,947 A | 5/1930 | Lee | 15/351 |
| 1,798,510 A | 3/1931 | Winslow et al. | 55/426 |
| 1,826,798 A | 10/1931 | Lee | 15/351 |
| 1,897,144 A | 2/1933 | Prouty | 209/712 |
| 1,937,765 A | 12/1933 | Leathers | 15/410 |
| 2,014,287 A | 10/1935 | Newman | 55/429 |
| 2,143,421 A | 1/1939 | Loehr et al. | 55/424 |
| 2,171,248 A | 9/1939 | Van Berkel | 55/392 |

(List continued on next page.)

FOREIGN PATENT DOCUMENTS

| | | |
|---|---|---|
| CA | 54488 | 5/1985 |
| CA | 2104136 | 6/1994 |
| CA | 2156069 | 6/1996 |
| DK | 52195 | 9/1936 |
| DK | 69708 | 1/1949 |
| EP | 0 815 788 | 1/1998 |
| EP | 0836 827 | 4/1998 |
| EP | 0 839 489 | 5/1998 |
| FR | 1 094 603 | 5/1955 |
| GB | 762070 | 12/1950 |
| GB | 2330786 | 5/1999 |
| SU | 148023 | 3/1961 |
| SU | 1042812 | 9/1983 |
| WO | WO 95/16382 | 6/1995 |
| WO | WO 96/19293 | 6/1996 |
| WO | WO 96/19294 | 6/1996 |
| WO | WO 96/19936 | 7/1996 |
| WO | WO 96/19937 | 7/1996 |
| WO | WO 96/21389 | 7/1996 |
| WO | WO 96/22726 | 8/1996 |

(List continued on next page.)

*Primary Examiner*—Theresa T. Snider
(74) *Attorney, Agent, or Firm*—Philip C. Mendes da Costa; Bereskin & Parr

(57) ABSTRACT

A vacuum cleaner has a first cyclonic cleaning stage and a second cyclonic stage positioned in series with the first cyclonic cleaning stage. The second cyclonic stage comprises a plurality of second stage cyclones. A passage connects the first cyclonic cleaning stage outlet and the second stage cyclones inlets. The passage does not increase in cross-sectional area in a downstream direction.

8 Claims, 8 Drawing Sheets

U.S. PATENT DOCUMENTS

| | | | | |
|---|---|---|---|---|
| 2,267,764 | A | 12/1941 | Taylor | 15/410 |
| 2,300,266 | A | 10/1942 | Smellie | 15/326 |
| 2,372,514 | A * | 3/1945 | Pootjes | 55/343 |
| 2,392,872 | A | 1/1946 | Wolfe | 55/345 |
| 2,397,872 | A | 4/1946 | Kovacs | 227/149 |
| 2,397,980 | A | 4/1946 | Petri | 55/426 |
| 2,402,845 | A | 6/1946 | Rodman | 55/345 |
| 2,405,625 | A | 8/1946 | Whiton et al. | 55/323 |
| 2,595,752 | A | 5/1952 | Batts | 248/224.8 |
| 2,608,268 | A | 8/1952 | Gerber | 55/317 |
| 2,672,642 | A | 3/1954 | Tamarin et al. | 15/323 |
| 2,681,124 | A | 6/1954 | Van der Kolk | 55/398 |
| 2,822,060 | A | 2/1958 | Udovich | 55/459.1 |
| 2,993,223 | A | 7/1961 | Krammes | 15/320 |
| D197,459 | S | 2/1964 | Jepson et al. | 15/351 |
| 3,200,568 | A | 8/1965 | McNeil | 96/195 |
| 3,235,090 | A | 2/1966 | Bose et al. | 210/512.1 |
| 3,283,480 | A | 11/1966 | Szego | 55/340 |
| 3,320,727 | A | 5/1967 | Farley et al. | 55/337 |
| 3,425,192 | A | 2/1969 | Davis | 55/345 |
| 3,501,014 | A | 3/1970 | Fitch, Jr. et al. | 210/512.1 |
| 3,535,854 | A | 10/1970 | Taylor | 55/338 |
| 3,675,268 | A | 7/1972 | Nordeen | 15/350 |
| 3,853,518 | A | 12/1974 | Tu et al. | 55/337 |
| 3,877,902 | A | 4/1975 | Eriksson et al. | 55/337 |
| 3,925,045 | A | 12/1975 | Cheng | 55/345 |
| 3,955,236 | A | 5/1976 | Mekelburg | 15/314 |
| 4,005,998 | A | 2/1977 | Gorman | 95/219 |
| 4,141,698 | A | 2/1979 | Kihlstedt et al. | 95/69 |
| 4,162,149 | A | 7/1979 | Mekelburg | 55/315 |
| 4,198,290 | A | 4/1980 | Summers | 209/710 |
| 4,251,368 | A | 2/1981 | Colman et al. | 210/788 |
| 4,268,288 | A | 5/1981 | Coombs | 55/537 |
| 4,326,862 | A | 4/1982 | Suzuki | 96/18 |
| 4,345,572 | A | 8/1982 | Suzuki et al. | 123/568.11 |
| 4,352,681 | A | 10/1982 | Dietz | 96/61 |
| 4,373,228 | A | 2/1983 | Dyson | 15/350 |
| 4,377,882 | A | 3/1983 | Dyson | 15/335 |
| 4,390,426 | A | 6/1983 | Vicard | 210/243 |
| 4,398,928 | A | 8/1983 | Kunsagi | 96/27 |
| 4,443,234 | A | 4/1984 | Carlsson | 96/57 |
| 4,571,772 | A | 2/1986 | Dyson | 15/335 |
| 4,573,236 | A | 3/1986 | Dyson | 15/333 |
| 4,588,423 | A | 5/1986 | Gillingham et al. | 96/43 |
| 4,593,429 | A | 6/1986 | Dyson | 15/353 |
| RE32,257 | E | 10/1986 | Dyson | 15/335 |
| 4,643,748 | A | 2/1987 | Dyson | 55/338 |
| 4,665,582 | A | 5/1987 | Richmond et al. | 15/351 |
| 4,756,729 | A | 7/1988 | Brunnmair et al. | 55/391 |
| 4,826,515 | A | 5/1989 | Dyson | 55/345 |
| 4,853,008 | A | 8/1989 | Dyson | 55/345 |
| 4,853,011 | A | 8/1989 | Dyson | 55/345 |
| D305,269 | S | 12/1989 | Dyson | D32/22 |
| 4,905,341 | A | 3/1990 | Sunagawa et al. | 15/351 |
| 5,062,870 | A | 11/1991 | Dyson | 96/400 |
| 5,078,761 | A | 1/1992 | Dyson | 96/400 |
| 5,090,976 | A | 2/1992 | Dyson | 55/337 |
| 5,101,532 | A | 4/1992 | Dyson et al. | 15/320 |
| 5,145,499 | A | 9/1992 | Dyson | 55/337 |
| 5,160,356 | A | 11/1992 | Dyson | 55/345 |
| 5,267,371 | A | 12/1993 | Soler et al. | 15/327.5 |
| D343,707 | S | 1/1994 | Dyson | D32/22 |
| 5,350,432 | A | 9/1994 | Lee | 55/408 |
| 5,558,697 | A | 9/1996 | Dyson et al. | 95/12 |
| 5,564,160 | A | 10/1996 | Luebbering | 15/351 |
| 5,584,095 | A | 12/1996 | Redding et al. | 15/411 |
| 5,591,253 | A | 1/1997 | Altman et al. | 96/61 |
| D382,679 | S | 8/1997 | Dyson | D32/21 |
| 5,755,007 | A | 5/1998 | Dyson | 15/327.5 |
| 5,840,103 | A | 11/1998 | Dyson | 55/337 |
| 5,935,279 | A | 8/1999 | Kilström | 15/353 |
| 6,003,196 | A | 12/1999 | Wright et al. | 15/353 |
| 6,012,200 | A | 1/2000 | Murphy et al. | 15/352 |
| 6,070,291 | A * | 6/2000 | Bair et al. | 15/353 |
| 6,083,292 | A * | 7/2000 | Fumagalli | 55/345 |

FOREIGN PATENT DOCUMENTS

| | | |
|---|---|---|
| WO | WO 98/02080 | 1/1998 |
| WO | WO 98/10691 | 3/1998 |
| WO | WO 98/23381 | 6/1998 |
| WO | WO 98/27857 | 7/1998 |
| WO | WO 98/33424 | 8/1998 |
| WO | WO 98/35601 | 8/1998 |

* cited by examiner

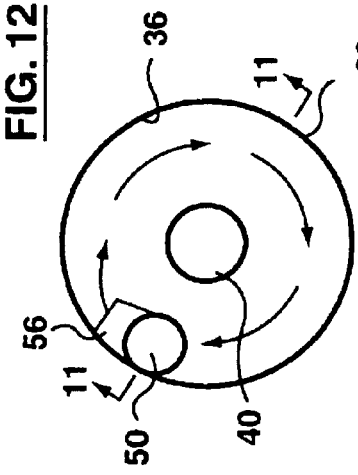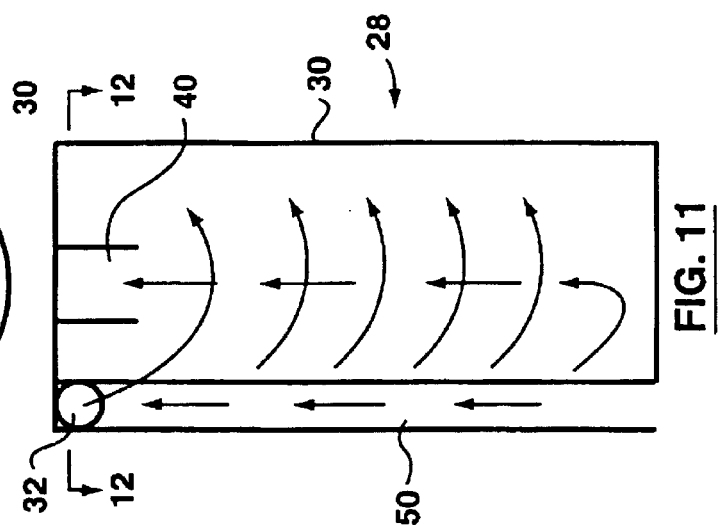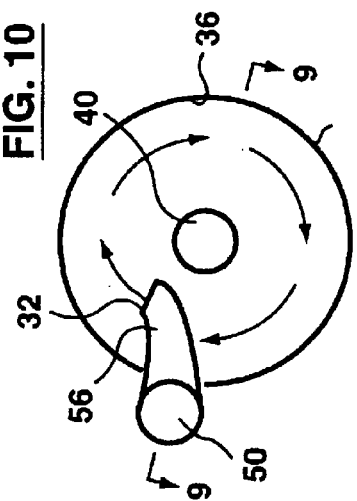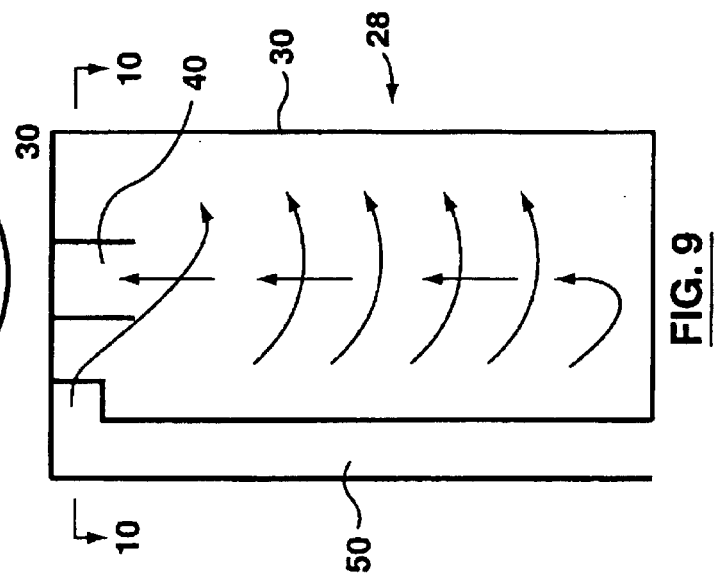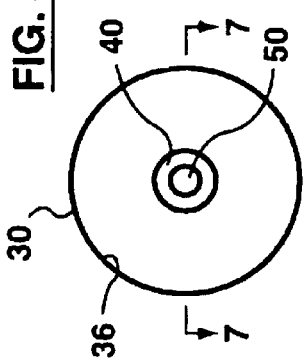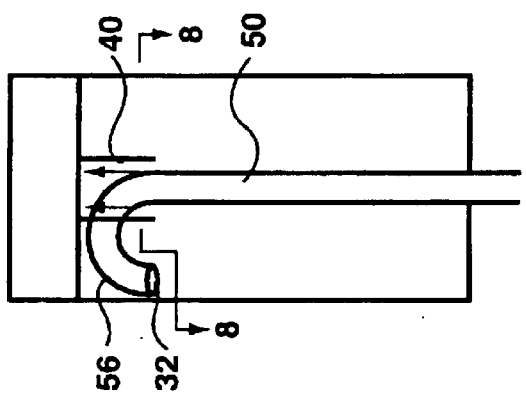

UPRIGHT VACUUM CLEANER WITH CYCLONIC AIR FLOW

The present application is a division of application Ser. No. 09/239,860, filed Jan. 29, 1999, which has now issued as U.S. Pat. No. 6,334,234, which is a continuation-in-part of Application No. 09/227,534 which has now issued as Pat. U.S. No. 6, 141,826.

FIELD OF THE INVENTION

The present invention relates generally to vacuum cleaners having at least two cyclonic separation stages.

BACKGROUND OF THE INVENTION

Various types of vacuum cleaners are traditionally produced. These include built in vacuum cleaners, canister vacuum cleaners and upright vacuum cleaners. Upright vacuum cleaners have a ground engaging portion and an upwardly extending portion. The ground engaging portion typically has wheels for movement of the cleaning head across a floor and a suction inlet for the intake of dirty air into the vacuum cleaner. The upwardly extending portion comprises the filter means for removing dirt which is entrained in the air. The upwardly extending portion generally has a handle for guiding the vacuum cleaner across the floor.

Traditionally in upright vacuum cleaners, the motor to draw the dirty air through the vacuum cleaner is positioned in the ground engaging head and the upward extending portion is pivotally mounted to the upper portion of the ground engaging member at a position adjacent the motor.

More recently, cydonic technology has been introduced commercially into canister and upright vacuum cleaners. See for example U.S. Pat. Nos. 4,373,228; 4,571,772; 4,573, 236; 4,593,429; 4,643,748; 4,826,515; 4,853,008; 4,853, 011; 5,062,870; 5,078,761; 5,090,976; 5,145,499; 5,160, 356; 5,255,411; 5,358,290; 5,558,697; and RE 32,257. These patents disdose a novel approach to vacuum cleaner design in which sequential cyclones are utilized as the filtration medium for a vacuum cleaner. Pursuant to the teaching of these patents, the first sequential cyclone is designed to be of a lower efficiency to remove only the larger particles which are entrained in an air stream. The smaller particles remain entrained in the air stream and are transported to the second sequential cyclone which is frusto-conical in shape. The second sequential cyclone is designed to remove the smaller particles which are entrained in the air stream. If larger particles are carried over into the second cyclone separator, then they will typically not be removed by the cyclone separator but exit the frusto-conical cyclone with the air stream.

The advantages of cyclonic separation have been combined with an upright vacuum cleaner to provide a household cyclonic vacuum cleaner, as shown in U.S. Pat. No. 4,593,429 to Dyson. As shown in FIG. 1, this vacuum cleaner 10 essentially comprises a large, outer cylindrical cyclone 12, with an inner cyclone 14 nested therein, which is mounted on a ground engaging member or floor-cleaning head and provided with a push handle for convenient movement of the unit. A motor, located in the floor cleaning head, draws air through the cleaning head and into an intake conduit 16, which delivers air to the dirty air inlet 18 of the outer cyclone container 12. From the outer cyclone the air flows into inner, nested dust separating cyclone 14, and from there, continues on through the vacuum motor to a dean air exhaust port.

The air intake conduit 16 connects the floor cleaning head and the dirty air inlet in air flow communication. Air intake conduit 16 extends upwardly along the outside of outer cyclone container 12 generally parallel to the longitudinal axis of the cyclones 12, 14. At a position adjacent air inlet 18 to outer cyclone 12, air intake conduit 16 bends 90° and travels inwardly to provide a tangential air flow inlet to air inlet 18 of outer cyclone container 12.

In use, air intake conduit 16 may become blockage. If the blockage occurs at a midpoint of the conduit, it may be difficult to clear the blockage. While a clean out port may be provided, the port may not be located near where the blockage occurs. Further, the addition of a port increases the cost and complexity of the manufacture of the product.

A bend in a conduit for a fluid causes a turbulent pressure loss in the conduit as the fluid travels through the bend in the conduit and the greater the sharpness of the bend, the greater the pressure loss. The pressure loss in the air flow decreases the amount of suction which can be generated at the cleaning head of the vacuum cleaner for any given motor in the vacuum cleaner and therefore the efficiency of the vacuum cleaner.

One disadvantage of cyclonic vacuum cleaners is the amount of power which is required to create an air flow sufficient to convey the dirty air through the cyclones at sufficient speeds to maintain the air flowing cyclonically through the cyclones.

SUMMARY OF THE INVENTION

In accordance with the instant invention, there is provided an upright vacuum cleaner comprising:
(a) a cleaning head for cleaning a surface;
(b) an upper body portion mounted on the cleaning head, the upper portion having a longitudinally extending axis and comprising:
    (i) at least one cyclone having an air entry port; and,
    (ii) a motor positioned above the at least one cyclone and in air flow communication with the at least one cyclone.

In accordance with the instant invention, there is also provided an upright vacuum cleaner comprising:
(a) a cleaning head for cleaning a surface having a forward portion and two spaced apart rear portions extending rearwardly from the forward portion;
b) an upper body portion mounted on the cleaning head, the upper portion having a longitudinally extending axis and at least one cyclone having an air entry port, the upper body portion mounted on the cleaning head at a position forward of the spaced apart rear portions, the spaced apart rear portions defining on open space therebetween sized for receiving the upper body portion therebetween when the upper body portion is in the lowered storage position.

In one embodiment, the cleaning head has a forward portion including an opening in air flow communication with the m at least one cyclone and two spaced apart rear portions extending rearwardly from the forward portion, the spaced apart rear portions defining on open space therebetween, the upper body portion mounted on the cleaning head at a position forward of the spaced apart rear portions.

In another embodiment, the upper portion is positionable in a lowered in use position wherein the longitudinally extending axis is at an angle of 40° to the vertical and, when the upper body portion is in the lowered in use position, the centre of gravity of the upper body portion is positioned above the open space. The upper body portion may further comprise a handle, the weight of the handle in the lowered in use position being 2 lbs. or less.

The spaced apart rear members may have floor contacting members such as glides or wheels adjacent the ends thereof. The floor contacting members may be positioned rearwardly of the centre of gravity when the upper body portion is in the lowered in use position.

In another embodiment, the upper body portion is pivotally connected to the cleaning head whereby the upper body portion is moveable between an in use position in which the upper body portion extends upwardly and rearwardly from the cleaning head and a lowered storage position in which the upper body portion extends generally rearwardly from the cleaning head. The cleaning head may have a forward portion and two spaced apart rear portions extending rearwardly from the forward portion, the upper body portion mounted on the cleaning head at a position forward of the spaced apart rear portions, the spaced apart rear portions defining on open space therebetween sized for receiving the upper body portion therebetween when the upper body portion is in the lowered storage position.

In another embodiment, the vacuum cleaner further comprises a mounting member engageable with a support member mounted on a wall whereby the vacuum cleaner may be hung flush against the wall when the upper body portion is in the lowered storage position.

In another embodiment, the vacuum cleaner further comprises a second cleaning member positioned downstream from the at least one cyclone.

In another embodiment, the vacuum cleaner further comprises an air outlet to the at least one cyclone for passage therethrough of air, the air passing generally upwardly from the air outlet to the motor.

In another embodiment, the second cleaning member is an electrostatic cleaning member.

In another embodiment, the second cleaning member is positioned between the at least one cyclone and the motor.

In another embodiment, the second cleaning member comprises at least one second cyclone.

In another embodiment, the second cleaning member comprises a plurality of second cyclones.

In another embodiment, the second cleaning member is positioned between the at least one cyclone and the motor, the vacuum cleaner further comprising an air outlet to the at least one cyclone and an air outlet to each of the at least one second cyclones, the air passing generally upwardly from the air outlet to the at least one cyclone to the at least one second cyclones and generally upwardly from the air outlet to the at least one second cyclones to the motor.

In another embodiment, the second cleaning member is positioned downstream of the motor, the vacuum cleaner further comprising an air outlet to the at least one cyclone, the air passing generally upwardly from the air outlet to the at least one cyclone to the motor and generally upwardly from motor to the at least one second cyclones.

In another embodiment, the vacuum cleaner further comprises an air inlet to the at least one cyclone and an air supply conduit communicating with the cleaning head and with the air entry port, a portion of the air supply conduit extending longitudinally through the cyclone. The air supply conduit may connect to the air entry port other than through a 90° elbow.

BRIEF DESCRIPTION OF THE DRAWINGS

For a better understanding of the present invention, and to show more clearly how it may be carried into effect, reference will now be made by way of example to the accompanying drawing which show a preferred embodiment of the present invention, in which:

FIG. 7 is a cross-section along the line 7—7 in FIG. 8 of a further alternate preferred embodiment of the instant invention;

FIG. 8 is a cross-section along line 8—8 in FIG. 7;

FIG. 9 is a cross-section along the line 9—9 in FIG. 10 of a further alternate preferred embodiment of the instant invention;

FIG. 10 is a cross-section along line 10—10 in FIG. 9;

FIG. 11 is a cross-section along the line 11—11 in FIG. 12 of a further alternate preferred embodiment of the instant invention;

FIG. 12 is a cross-section along line 12—12 in FIG. 11;

DETAILED DESCRIPTION OF THE PREFERRED EMBODIMENT

Figure 2:
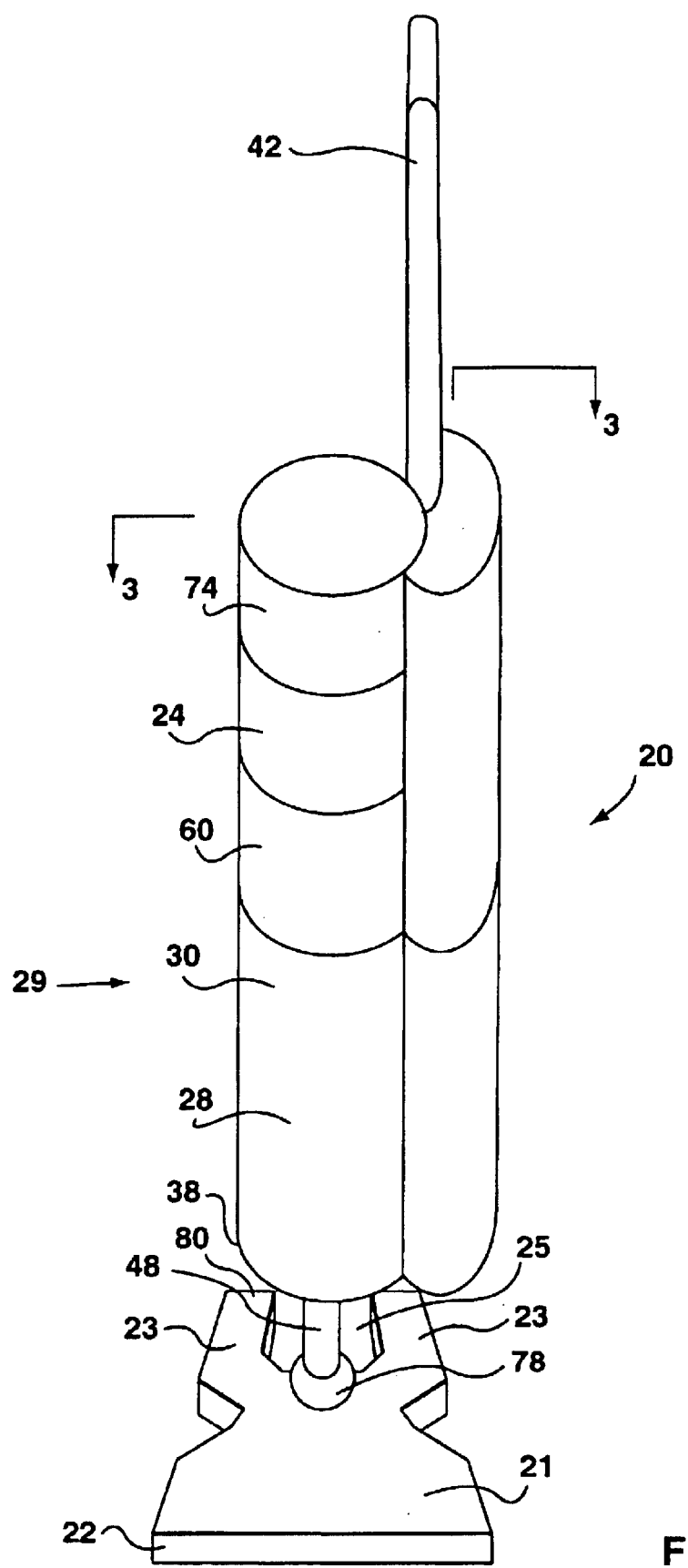
FIG. 2 is a perspective view of an upright cyclonic vacuum cleaner according to the present invention.
Figure 3:
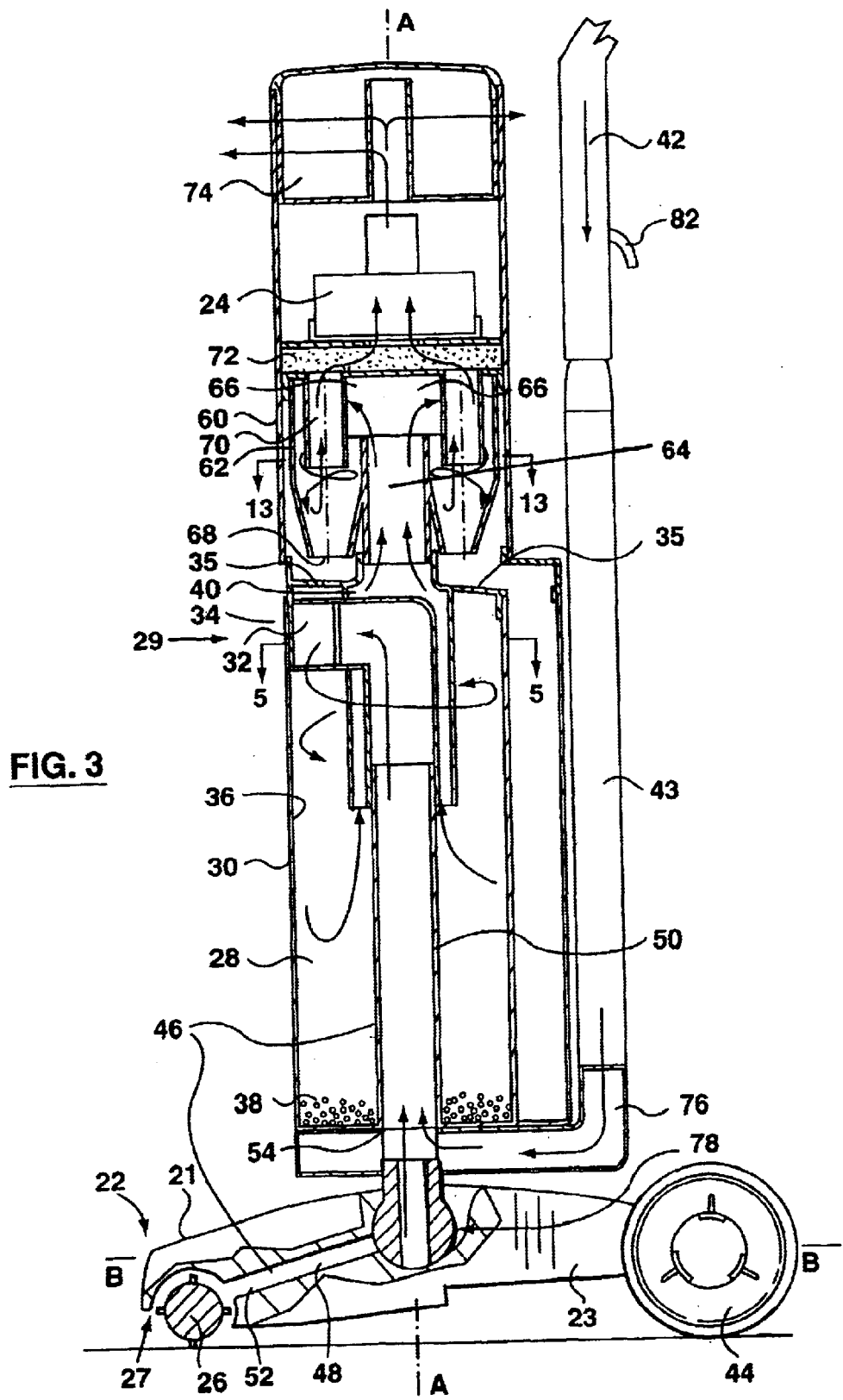
FIG. 3 is a cross-section along line 3—3 in FIG. 2 of the upright cyclonic vacuum cleaner of FIG. 2.

An upright cyclonic vacuum 20 according to the present invention is shown in the FIGS. 2 and 3. A floor cleaning head 22 is provided at the lower end of vacuum cleaner 20. Head 22 comprises a forward portion 21 and two rear portions 23 extending rearwardly from the forward portion 21. Rear portions 23 are spaced apart and define a space 25 there between. Head 22 has a dirty air inlet 27 which is positioned in forward portion 21 and, preferably, adjacent the front end of forward portion 21 (see FIG. 3). Preferably, head 22 also comprises a transversely extending, floor-contacting rotating brush member 26 which is mounted for rotation in head 22. A handle 42 and rear wheels 44 may be provided on head 22 to facilitate movement of the unit for cleaning of a floor, and the like. Head 22 may also incorporate a forward set of wheels (not shown) as is known in the art.

In order to be able to convert the vacuum cleaner for above the floor cleaning, handle 42 may be hollow and be connected to a flexible hose 43 for connecting handle in air flow communication with the dirt filtration stages in upper body portion 29.

Upper body portion 29 incorporates the filtration means for removing entrained dirt from the dirty air which is introduced into the vacuum cleaner, via, for example, dirty air inlet 27 and motor 24 which draws the air through vacuum cleaner 20. Upper body portion 29 comprises at least one cyclonic separation stage. Preferably, the vacuum cleaner includes at least two dirt separation stages. The first of the dirt separation stages preferably comprises a cyclonic dirt separation stage. The second stage may be a second cyclonic dirt separation stage or an electrostatic cleaner (eg. an electrostatic precipitator). It will be appreciated that additional dirt separation stages may be incorporated into the vacuum cleaner. For example, a screen or filter may be positioned between first and second cyclonic separations stages. Further, or alternately, a filter or a screen may be positioned upstream of motor 24. Further, a HEPA™ filter may be positioned in the air flow path through the vacuum cleaner, such as after motor 24.

According to the preferred embodiment of the vacuum cleaner shown in FIGS. 2 and 3, upper body portion 29 comprises cyclonic unit 28 positioned in the lower portion of upper body portion 29. Cyclonic unit 28 may comprise any type of dirt separation cyclone known in the art, e.g. cylindrical or frusto-conical, and may comprise a single cyclone or multiple cyclones (either in series and/or in parallel). Preferably, cyclonic unit 28 comprises a single cyclone. Referring to FIG. 3, cyclone unit 28 comprises cyclone container 30 having an air inlet 32, typically at an upper end 34 thereof, adapted for providing an air flow tangentially to an inner dirt rotation surface 36 of container 30. Container 30 also has a dirt collection surface or bottom 38 and a clean air outlet 40. Upper end 34 of container 30 is sealed, such as by an upper panel 35.

If the vacuum cleaner is used in the upright vacuum cleaner mode, the air flow path through cleaner 20 commences with an air supply conduit 46 having an upstream portion 48 in flow W commununication with dirty air intake 27 and a downstream portion 50. Upstream portion 48 is provided in head 22 and has a first end 52 positioned adjacent brush member 26 for receiving the dirt laden air and a distal second end 54. Downstream portion 50 is positioned in air flow communication with second end 54. Preferably upstream and downstream portions 48, 50 are substantially sealed together to prevent air and dirt leaking therefrom.

In one embodiment, upstream and downstream portions 48, 50 may comprise a single member (whether integrally formed or connected together). In such a case, portions 48, 50 are preferably flexible so as to allow cyclone container 30 to be emptied. Preferably, they are separate elements which are in air flow communication when container 30 is mounted in vacuum cleaner 20. Thus, if a blockage develops in conduit 46, by removing container 30 from vacuum cleaner 20, portions 48 and 50 may be individually accessed at end 54 to clean out the blockage.

As shown in FIGS. 3, 7 and 11 downstream portion 50 may extend upwardly through container 30. Alternately, as shown in FIGS. 9 and 11, downstream portion 50 may extend upwardly at a position adjacent the outer surface of container 30. Whether downstream portion 50 is provided internally (FIGS. 11) or externally (FIGS. 9) to container 30, by manufacturing the vacuum cleaner so that downstream portion 50 is removable with container 30 from the vacuum cleaner, access is provided to both the upstream and downstream portions of downstream portion 50 as well as end 54 of upstream portion 48. Accordingly, multiple access ports are effectively provided as part of the construction of the vacuum cleaner. It will be appreciated that downstream portion 50 may be manufactured as part of container 30 (such as by moulding it integrally therewith). Alternately, it may be separately manufactured (such as by extrusion) and subsequently affixed to container 30 by any means known in the art.

Downstream portion 50 may enter container 30 at any point (eg. via a side wall) but preferably enters through bottom 38. Further downstream portion 50 preferably extends generally upwardly through the central portion of container 30 which comprises the area occupied by the vertical return path of the air as it travels from bottom 38 to outlet 40. As shown in FIG. 3, downstream portion 50 preferably extends coaxially with the longitudinal axis A of container 30, however, it may be positioned off centre either internal of container 30 (see for example FIG. 11) or external of container 30 (see for example FIG. 9).

Downstream portion 50 is preferably positioned at any location within container 30 where it does not unduly interfere with the cyclonic flow of air within container 30. For this reason, if downstream portion 50 is positioned within container 30, it preferably is centrally located in container 30. In particular, in a cyclone, the air travels generally in an annular band adjacent surface 36 of container 30. The air travels generally downwardly until it reaches a position towards bottom 38 of container 30 at which point the air travels upwardly through the central portion of cyclone container 30. In a most preferred embodiment of this invention, downstream portion 50 is positioned within this central portion of container 30 which contains this upflow of air.

As shown in FIG. 11, downstream portion 50 may be positioned adjacent sidewall 36. In such cases, downstream portion 50 is preferably constructed so as to minimize its interference with the flow of air around surface 36. For example, downstream portion 50 may be constructed with rounded surfaces so as to direct the flow of air around downstream portion 50. Further, downstream portion 50 need not be circular in shape but may be elliptical or of other constructions wherein it has a radial extent (i.e. around inner surface 36) which is substantially greater than its width in a direction transverse thereto (i.e. radially inwardly). Thus, downstream portion 50 would extend only slightly into container 30 and would not substantially interfere with the cyclonic flow of air in container 30.

Exit portion 56 is positioned at the upper end of downstream portion 50. Inlet 32 is positioned at the distal end of exit portion 56 from downstream portion 56. Exit portion 56 may extend along any desired path from downstream portion 50 to inlet 32. Preferably, exit portion 56 is wholly positioned within container 30 (eg. it does not exit container 30 through upper end 34).

Figure 4:
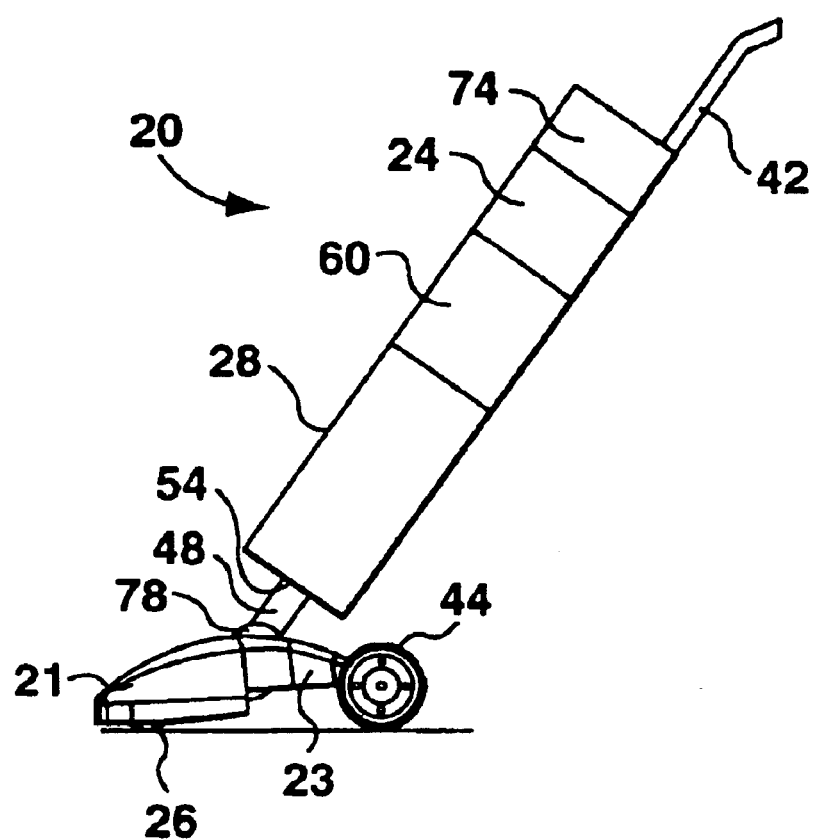
FIG. 4 is a side view of the vacuum cleaner of FIG. 2 in an in use position.

Exit portion 56 may extend at a right angle to downstream portion 50 as shown in FIG. 3. Further, it may extend in a straight line to inlet 32 as shown in FIG. 4. It will be appreciated that inlet 32 may be any inlet known in the cyclonic art to introduce air tangentially into a cyclone and it may be positioned at any point along the longitudinal length of container 30 as is known in the cydonic art.

Figure 6:
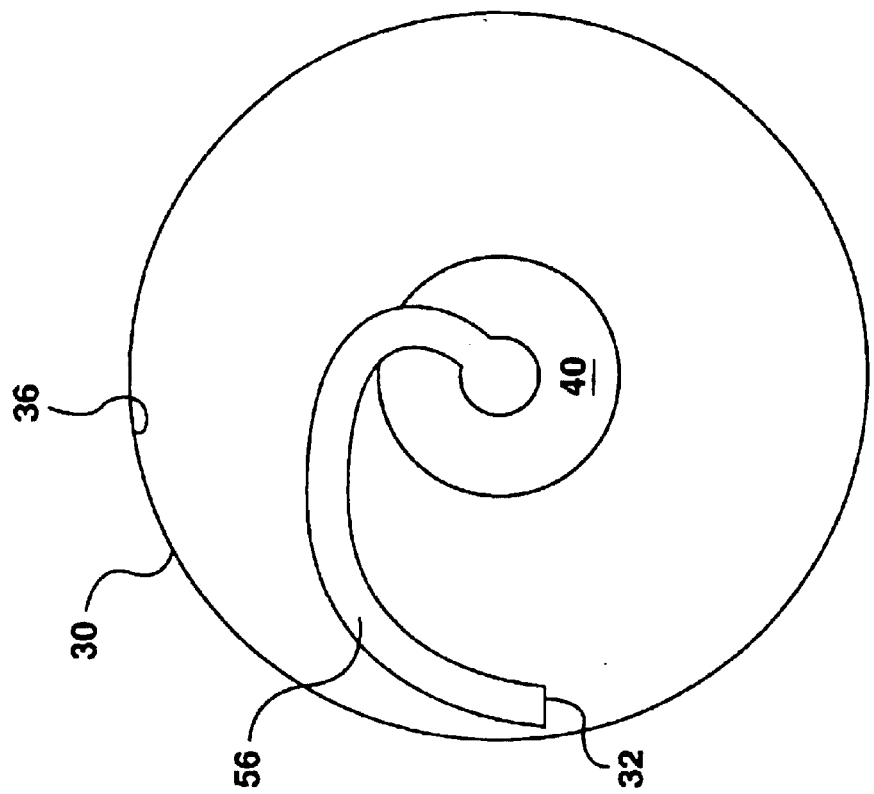
FIG. 6 is a cross-section along line 5—5 in FIG. 3 of an alternate preferred embodiment.
Figure 5:
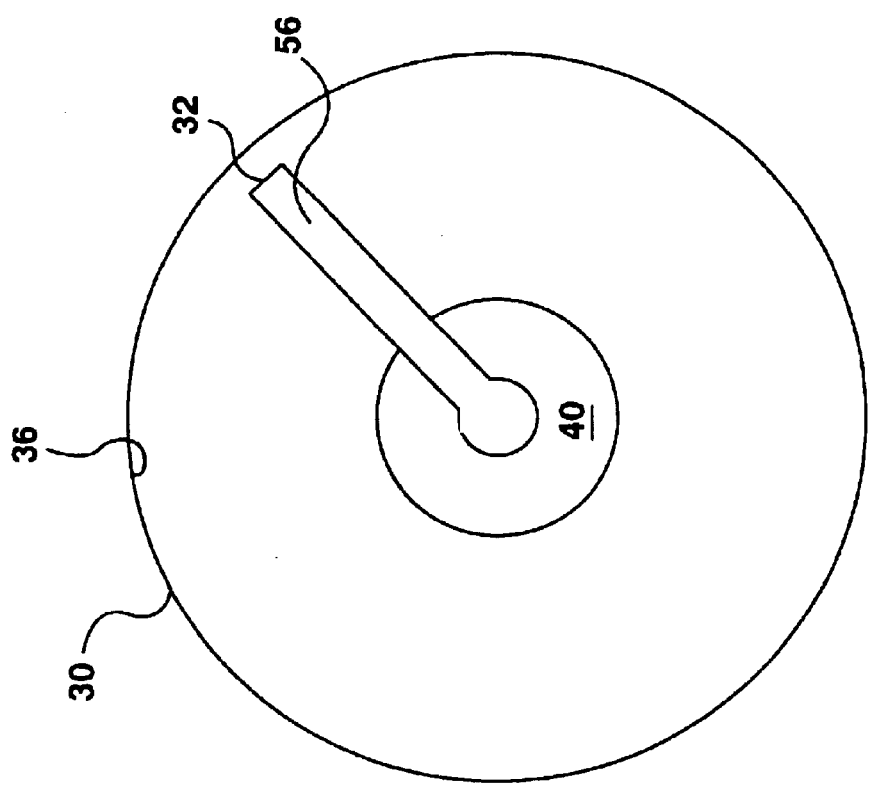
FIG. 5 is a cross-section along line 5—5 in FIG. 3.

In one preferred embodiment, exit portion 56 includes a curved portion. More preferably, as shown in FIG. 6, exit portion 56 is curved so as to impart circular momentum to the dirty air as it travels therethrough. Depending upon the degree of curvature, exit portion 56 may assist in tangentially introducing the dirty air into container 30 or it may be the sole source of tangential entry into container 30 (eg. inlet 32 may merely be an opening in exit portion 56 which does not impart any tangential rotation to the dirty air). By constructing the supply conduit in this manner, a 90° elbow is not required to redirect the dirty air to enter container 30 tangentially. In a typical application, replacing a 90° elbow with a gradual curved path to redirect the dirty air results in a about a 5 to 10% reduction in the loss of suction as the air travels through the vacuum cleaner. Thus, a smaller motor may be incorporated into the vacuum cleaner to obtain the same pressure at inlet 32 or the suction at end 52 may be increased if the same motor is used.

Referring to FIG. 7, it will be appreciated that the dirty air travelling in downstream portion 50 travels outwardly to inlet 32. In an alternate preferred embodiment, exit portion 56 curves gently from the upper end of downstream portion 50 so as to travel outwardly towards inlet 32. More preferably, the change in direction of the dirty air from vertical to horizontal and from horizontal to tangential occurs so as to reduce the pressure drop during its travel from downstream portion 50 to container 30.

Centrally located in upper end 34 of container 30 is a clean air outlet 40 for permitting withdrawal of air from container 30. From clean air outlet 40, the air flow may proceed to vacuum fan motor 24 or to a second stage of filtration, such as a second cyclone or other filtration means (eg. an electrostatic precipitator, a mesh screen or a filter). Subsequently, it may be in air flow communication with vacuum fan motor 24.

In operation, the vacuum fan motor 24 is activated to induce an air flow through cleaner 20. The air flow causes a partial vacuum to form at end 52. Air, and entrained dirt, is drawn into upstream portion 48, with the aid of brush member 26. The dirty air flow moves upwardly in downstream portion 50 to dirty air inlet 32 via exit portion 56 and is introduced tangentially to container 30. The airflow is then accelerated around dirt rotation surface 36, and proceeds generally downwardly along and around dirt rotation surface 36 until it reaches a position towards bottom 38 of container 30, at which point the air flow travels upwardly through the central portion of cyclone container 30. Container 30 may incorporate a wall which is a cylindrical sleeve extending downwardly from outlet 40 to assist in preventing the treated air travelling upwardly to outlet 40 from mixing with the dirty air which is introduced into container 30 via inlet 32.

As can be seen by a comparison of intake conduits 16 and 46, of cleaner 10 and cleaner 20 respectively, the reduction of bends in the air conduit of the present invention beneficially results in a significant reduction in the turbulent pressure loss in the intake conduit, thereby markedly improving the efficiency of the cyclonic separation device as a whole.

The presence of downstream portion 50 extending through the centre of container 30 interferes minimally with the cyclonic action of the air flow within container 30. Thus the presence of downstream portion 50 does not significantly effect the efficiency of the cyclone.

If upper body portion 29 comprises only a single dirt filtration stage, then outlet 40 may be an air communication with motor 24. Alternately, if upper body portion 29 comprises a second or more filtration stage, then outlet 40 may be an air communication with the second filtration stage (as is shown in FIG. 3). It will be appreciated that motor 24 may be positioned at any stage in the air flow path through upper body portion 29 provided a sufficient amount of dirt has been removed from the air so as not to damage or unduly damage motor 24.

Figure 13:
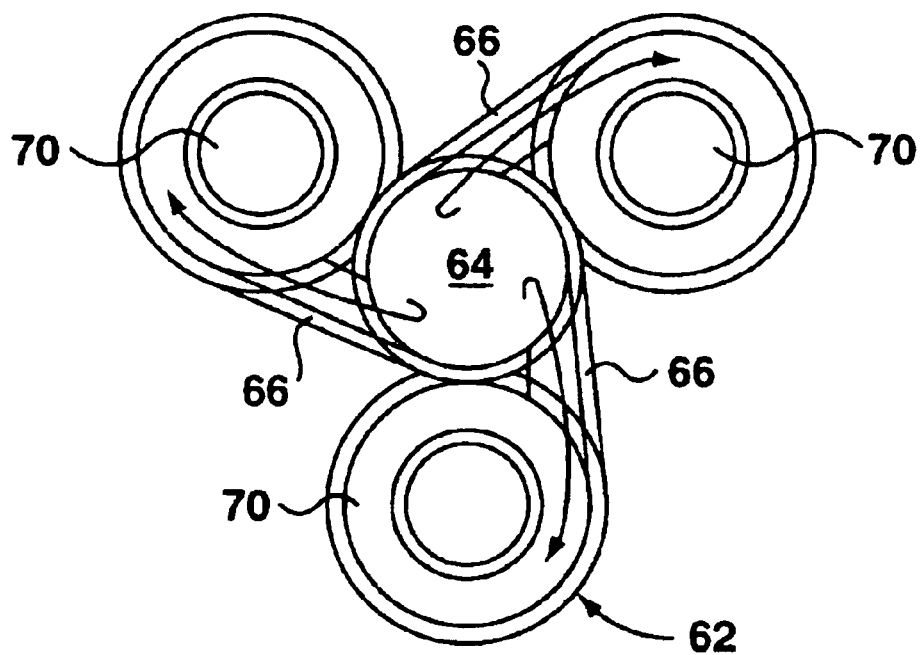
FIG. 13 is a cross-section along the line 13—13 in FIG. 3.

As shown in FIG. 2, vacuum cleaner 20 includes second filtration stage 60. The second filtration stage may comprise one or more cyclones. If the second stage comprises a plurality of cyclones, they may be either in series or parallel but are preferably in parallel. In the preferred embodiment of FIGS. 3 and 13, second filtration stage 60 comprises three second cyclones 62. Second cyclones 62 may be the same or different and may of any particular configuration known in the art. Second filtration stage 60 also comprises a conduit 64 in fluid flow communication with outlet 40 from the first stage cyclone 28. Conduit 64 is in air flow communication with inlets 66 to second stage cyclones 62. The partially cleaned air is introduced tangentially into second stage cyclones 62 and travels downwardly therethrough with the separated dirt exiting second cyclones 62 via dirt outlets 68. The further cleaned air travels upwardly through the central portion of second cyclones 62 to air outlets 70.

In accordance with this invention, conduit or passage 64 does not increase in cross-sectional area in the downstream direction (i.e. in the direction from the first cyclonic cleaning stage to the second cyclonic cleaning stage 60). Passage 64 may have a cross sectional area which is approximately the same as the cross sectional area of first cyclonic cleaning stage outlet 40 and may be defined by a single conduit. Preferably, as shown in FIG. 3, second stage cyclones 62 at least partially surround passage 64. More preferably, passage 64 is at least partially defined by second stage cyclones 62. Passage 64 is preferably substantially free of horizontal spaces that are transverse to the direction of fluid flow through passage 64 and is preferably substantially free of any dead air spaces and/or regions that are adapted to separate particulate matter from the air stream.

The air may travel directly to motor 24 or may pass through a screen or filter 72 which is positioned between second filtration stage 60 and motor 24. The cleaned air travelling by motor 24 cools the motor. The cooled air may then exit the vacuum cleaner or may pass through a further filtration stage.

In FIGS. 2 and 3, the air passes upwardly from motor 24 to a third filtration stage which comprises, eg., a HEPA™ filter or an electrostatic precipitator. The further cleaned air exits vacuum cleaner 20 after passage through third filtration stage 74.

In an alternate embodiment, if the vacuum cleaner is convertible for off the floor cleaning (i.e. in a canister mode), then handle 42 may be in air flow communication with the upstream portion of conduit 48 by a flexible hose 43 and conduit 76. Suitable valving means known in the art may be incorporated to selectively connect in air flow communication dirty air inlet 27 and handle 42 with conduit 50.

By this design, it will be appreciated that from second end 54, the dirty air travels upwardly through the filtration stages and exits the vacuum cleaner at the top. In particular, the air travels upwardly to air inlet 32 to cyclonic unit 28. The air then travels upwardly to the air inlets 66 to the second cyclone 62. The air then travels upwardly from air outlet 70 to the motor and, if desired, further upwardly to the third filtration stage 74 prior to exiting the vacuum cleaner. Regardless of the sequence of the filtration stages, or their numbers, the air continues to travel generally upwardly from one stage to the next without substantial bends or 90° elbows being required to direct the air flow.

Figure 1:
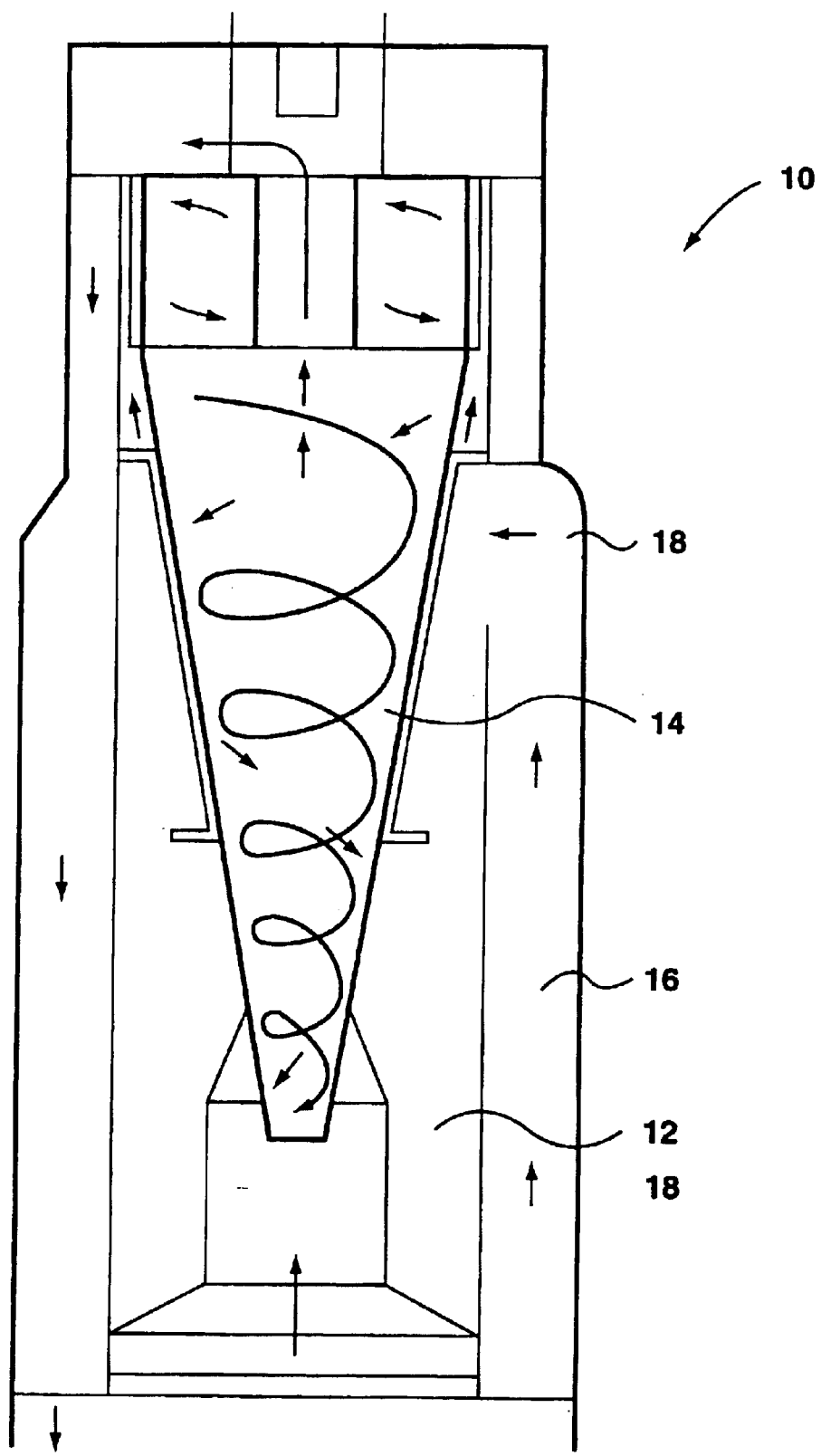
FIG. 1 is a cross-sectional side elevation of an upright cyclonic vacuum cleaner with an air intake conduit according to the prior art.

In conventional designs as shown in FIG. 1, the air must reverse course and flow downwardly into head 22 so as to cool the motor. By positioning the motor in upper body portion 29 in the air flow path, a substantially more direct air flow path may be created (by the elimination of several elbows required to bring the cleaned air down to head 22) thus substantially reducing the pressure drop. For example, the pressure drop through the vacuum a cleaner such as is shown in FIG. 3 may be about 35 inches of water at 45 cfm. By substantially reducing the pressure drop through the vacuum cleaner, the size of motor 24 may be consequentially reduced without reducing the air flow or suction through the vacuum cleaner.

Figure 14:
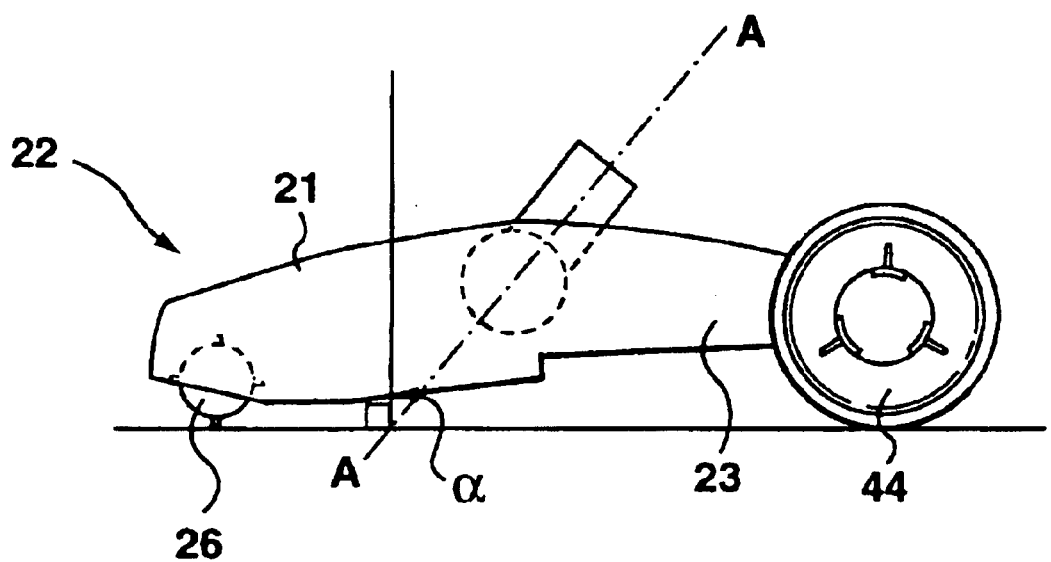
FIG. 14 is a side elevational view of the cleaning head of the vacuum cleaner of FIG. 2 when the vacuum cleaner is in the lowered in use position; and, FIG. 15 is an elevational view of the vacuum cleaner when hung from the wall.

Upper body portion 29 is preferably pivotally mounted to head 22 such as by a ball joint 78. Accordingly, the upper body portion may be positionable in an upright storage position as shown in FIG. 3 wherein upper body portion 29 extends generally vertically upwardly from head 22. Upper body portion 29 may be lockingly positioned in this place by a locking means as is known in the art. Upper body portion 29 is preferably so positioned at a position forward of rear portions 23 and more preferably on front portion 21. Head 22 is preferably configured given the vertical position of motor 24 in upper body portion 29 such that when upper body portion 29 is at an angle of 40° to the vertical as shown in FIG. 14, then the centre of gravity of upper body portion 29 is positioned in front of wheels 44 and, more preferably, above space 25.

In a particularly preferred embodiment, upper body portion 29 is positionable in a lowered storage position wherein upper body portion 20 extends generally rearwardly from front portion 21 of head 22. Preferably, space 25 has a sufficient width so as to allow upper body portion 20 to fit therewithin so that longitudinal axis 8 of head 22 is generally parallel to longitudinal axis A of upper body portion 29. More preferably, longitudinal axis A and B define a continuous axis when upper body portion 29 is a lowered stored position.

Figure 15:
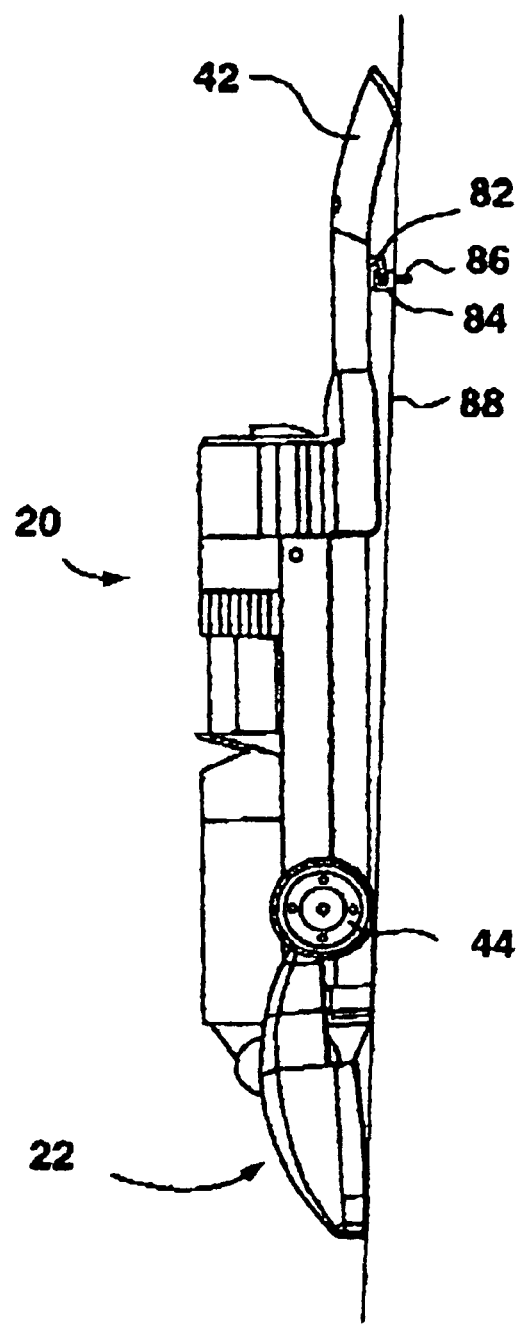

In a particular preferred embodiment, space 25 has a sufficient width to accommodate therein the lower portion of upper body portion 29. Thus rear portions extend on either side of upper body portion 29 when upper body portion 29 is in the lowered. storage position. However, if the portion of conduit 48 extending from joint 78 to bottom 38 is sufficiently long, upper body portion 20 may be positionable in the lowered storage position such that bottom 38 is spaced from rearward ends 80 of rear portions 23. With this profile, vacuum cleaner 20 may be easily placed under many beds and like pieces of furniture for storage or cleaning. Further, it may be hung for storage such as from a hook mounted in a wall or from a ceiling by means of hanger 82 using any hanger means known in the art. For example, as shown in FIG. 15, hanger mount 84 may be fixedly a mounting means such as a nail or screw 86. Mounting means 84 is adapted for engaging hanger 82. Accordingly, as shown in FIG. 15, hanger 82 is received in hanger mount 84 when the vacuum cleaner is configured to the towered storage position and raised above the floor so that hanger 82 may be received in hanger mount 84

Despite having motor 24 positioned on upwardly extending portion 29, only a small amount of force may be required to hold vacuum cleaner 20 in an in use position as shown in FIG. 4. For example, when upper body portion 29 is inclined such that axis A is at an angle α (see FIG. 14) of 40° to the vertical, the weight exerted by handle 42 in the hand of a user may be less than three pounds and, preferably, is less than two pounds. Accordingly, the vacuum cleaner provides ease of use despite the position of the motor towards the upper body portion 29.

Therefore, the configuration of the air path through the vacuum cleaner according to the present invention advantageously permits a substantial reduction in the pressure loss without interfering with the overall performance of the cyclone separation device. Thus, the present invention permits a smaller motor to be used to provide a similar draw at the intake end 52 compared to current designs.

While the above description constitutes the preferred embodiments, it will be appreciated that the present invention is susceptible to modification and change without departing from the fair meaning of the proper scope of the accompanying claims.

We claim:

1. A vacuum cleaner comprising:
   (a) a nozzle and a source of suction to draw air containing particulate matter into the nozzle and produce an air stream in the vacuum cleaner;
   (b) a first cyclonic cleaning stage comprising a cyclone having a first cyclonic cleaning stage inlet and a first cyclonic cleaning stage outlet;
   (c) a second cyclonic cleaning stage positioned in series with the first cyclonic cleaning stage, the second cyclonic cleaning stage comprising a plurality of second stage cyclones, each of the second stage cyclones having a second stage cyclone inlet and a second stage cyclone outlet; and,
   (d) a passage connecting the first cyclonic cleaning stage outlet and the second stage cyclone inlets wherein the passage does not increase in cross-sectional area in a downstream direction.

2. The vacuum cleaner as claimed in claim 1 wherein the second stage cyclones at least partially surround the passage.

3. The vacuum cleaner as claimed in 1 wherein the passage is at least partially defined by the second stage cyclones.

4. The vacuum cleaner as claimed in claim 1 wherein the passage has a cross sectional area which is approximately the same as the cross sectional area of the first cyclonic cleaning stage outlet.

5. The vacuum cleaner as claimed in claim 1 wherein the passage is substantially free of horizontal spaces that are transverse to the direction of fluid flow through the passage.

6. The vacuum cleaner as claimed in claim 1 wherein the passage Is substantially free of any dead air spaces.

7. The vacuum cleaner as claimed in claim 1 wherein the passage Is substantially free of regions that are adapted to separate particulate matter from the air stream.

8. The vacuum cleaner as claimed in claim 1 wherein the passage is defined by a single conduit.

* * * * *